United States Patent
Chen et al.

(10) Patent No.: US 10,362,872 B1
(45) Date of Patent: Jul. 30, 2019

(54) FOLDING DRAWER FOR CABINET

(71) Applicants: Kung-Cheng Chen, Taichung (TW); Lung-Chuan Huang, Taichung (TW)

(72) Inventors: Kung-Cheng Chen, Taichung (TW); Lung-Chuan Huang, Taichung (TW)

(73) Assignee: E-MAKE CO., LTD., Taichung (TW)

( * ) Notice: Subject to any disclaimer, the term of this patent is extended or adjusted under 35 U.S.C. 154(b) by 0 days.

(21) Appl. No.: 16/162,657

(22) Filed: Oct. 17, 2018

(30) Foreign Application Priority Data

Jun. 12, 2018 (TW) ............................. 107207901 U (51) Int. Cl.
| | |
|---|---|
| *A47B 88/40* | (2017.01) |
| *A47B 88/90* | (2017.01) |
| *B62B 3/00* | (2006.01) |
| *A47B 88/407* | (2017.01) |

(52) U.S. Cl.
CPC ........ *A47B 88/9414* (2017.01); *A47B 88/407* (2017.01); *B62B 3/005* (2013.01); *A47B 2210/0059* (2013.01); *A47B 2210/01* (2013.01); *A47B 2210/092* (2013.01)

(58) Field of Classification Search
CPC .... A47B 88/40; A47B 88/407; A47B 88/9414
USPC ................. 312/330.1, 348.1, 348.4
See application file for complete search history.

(56) References Cited

U.S. PATENT DOCUMENTS

| | | | | |
|---|---|---|---|---|
| 1,822,448 | A * | 9/1931 | Morin ................ | A47B 88/9412 220/6 |
| 3,729,246 | A * | 4/1973 | Harrell ................. | A47B 88/941 312/261 |
| 9,493,177 | B1 * | 11/2016 | Chen ....................... | B62B 3/005 |
| 2002/0024275 | A1 * | 2/2002 | Morgan ................. | A47B 67/04 312/294 |
| 2013/0049560 | A1 * | 2/2013 | Liu ..................... | A47B 88/9412 312/348.1 |
| 2013/0106272 | A1 * | 5/2013 | Chung ............... | A47B 88/9414 312/348.2 |
| 2016/0235172 | A1 * | 8/2016 | Jose ..................... | A45C 7/0036 |

\* cited by examiner

*Primary Examiner* — James O Hansen (57) ABSTRACT

A folding drawer includes a bottom board; two side panels each including a slide and an L-shaped positioning member on a top of a rear end; a rear panel including two U-shaped grooves on two sides respectively, and two flexible projections each adjacent to the U-shaped groove wherein the L-shaped positioning member is configured to dispose in the U-shaped groove; a front panel; a first hinge on a joining portion of a rear surface of the rear panel and a bottom of the bottom board, a second hinge on a joining portion of an inner surface of one side panel and a top of the bottom board, and a third hinge on a joining portion of an inner surface of the other side panel and the top of the bottom board.

4 Claims, 9 Drawing Sheets

FOLDING DRAWER FOR CABINET

BACKGROUND OF THE INVENTION

1. Field of the Invention

The invention relates drawers and more particularly to a folding drawer for cabinet which can be assembled or disassembled quickly so that space of the folded drawer can be decreased for ease of storage or delivery.

2. Description of Related Art

U.S. Pat. No. 9,493,177 to Chen et al., entitled "Takedown utility cart having drawers and a lock assembly", discloses a wheeled utility cart having a plurality of drawers. However, the drawers are not foldable. Thus, its space in storage or delivery is relatively large.

A conventional cabinet comprises a plurality of drawers retractably disposed therein. Each drawer has a front panel, two side panels, a rear panel, and a bottom board. However, the drawer cannot be folded. Thus, it is relatively bulky when many drawers are stacked. A space saving storage or delivery is not possible.

Thus, the need for a folding drawer for cabinet exists.

SUMMARY OF THE INVENTION

It is therefore one object of the invention to provide a folding drawer comprising a bottom board including a plurality of holes in a front end; two side panels each including a plurality of holes in a front end, a slide on an outer surface, and an L-shaped positioning member on a top of a rear end; a rear panel including two U-shaped grooves on two sides respectively, and two flexible projections each adjacent to the U-shaped groove wherein the L-shaped positioning member is configured to dispose in the U-shaped groove; a front panel including a plurality of holes in a lower portion of a rear surface; a plurality of pins each having two ends fitted in either the hole of the front panel and the hole of the bottom board respectively or the hole of the front panel and the hole of either side panel respectively; and first, second and third hinges wherein the first hinge is disposed on a joining portion of a rear surface of the rear panel and a bottom of the bottom board, the second hinge is disposed on a joining portion of an inner surface of one side panel and a top of the bottom board, and the third hinge is disposed on a joining portion of an inner surface of the other side panel and the top of the bottom board.

The above and other objects, features and advantages of the invention will become apparent from the following detailed description taken with the accompanying drawings.

DETAILED DESCRIPTION OF THE INVENTION

Referring to FIGS. 1 to 13, a folding drawer 1 in accordance with the invention comprises the following components as discussed in detail below.

A bottom board 10 includes a plurality of holes 11 in a front end. Two side panels 20 each include a plurality of holes 21 in a front end, a slide 22 on an outer surface, and an L-shaped positioning member 23 on a top of a rear end. A rear panel 30 includes two U-shaped grooves 31 on two sides respectively, and two flexible projections 32 each adjacent to the U-shaped groove 31. The L-shaped positioning member 23 is configured to dispose in the U-shaped groove 31 by pivoting. A front panel 40 includes a plurality of holes 41 in a lower portion of a rear surface, and a handle 42 on a front surface. A plurality of pins 50 each have two ends fitted in two of the holes 11, 21 and 41 respectively. First, second and third hinges 60A, 60B and 60C in which the first hinge 60A is provided on a joining portion of a rear surface of the rear panel 30 and a bottom of the bottom board 10 so that the rear panel 30 is configured to dispose on the bottom of the bottom board 10 by clockwise pivoting 270-degree (see FIG. 7). The second hinge 60B is provided on a joining portion of an inner surface of one side panel 20 and a top of the bottom board 10 so that one side panel 20 is configured to dispose on the top of the bottom board 10 by clockwise pivoting 90-degree (see FIG. 9). The third hinge 60C is provided on a joining portion of an inner surface of the other side panel 20 and the top of the bottom board 10 so that the other side panel 20 is configured to dispose on the bottom of the bottom board 10 by pivoting 90-degree.

In an assembly operation of the drawer 1, an employee may counterclockwise pivot the rear panel 30 270-degree so that the rear panel 30 is perpendicular to the bottom board 10. Next, the employee may counterclockwise pivot each side panel 20 90-degree so that each side panel 20 is perpendicular to the bottom board 10. Next, the employee may press both the flexible projections 32 to insert the L-shaped positioning members 23 into the U-shaped grooves 31 respectively. Finally, the employee may insert two ends of each pin 50 into the holes 11 and 41 respectively (or the holes 21 and 41 respectively) to assemble the drawer 1.

In a folding operation, the employee may perform steps reverse to the steps described in the above paragraph to fold the drawer 1. The folded drawer 1 can save storage space or space in delivery.

Figure 1:
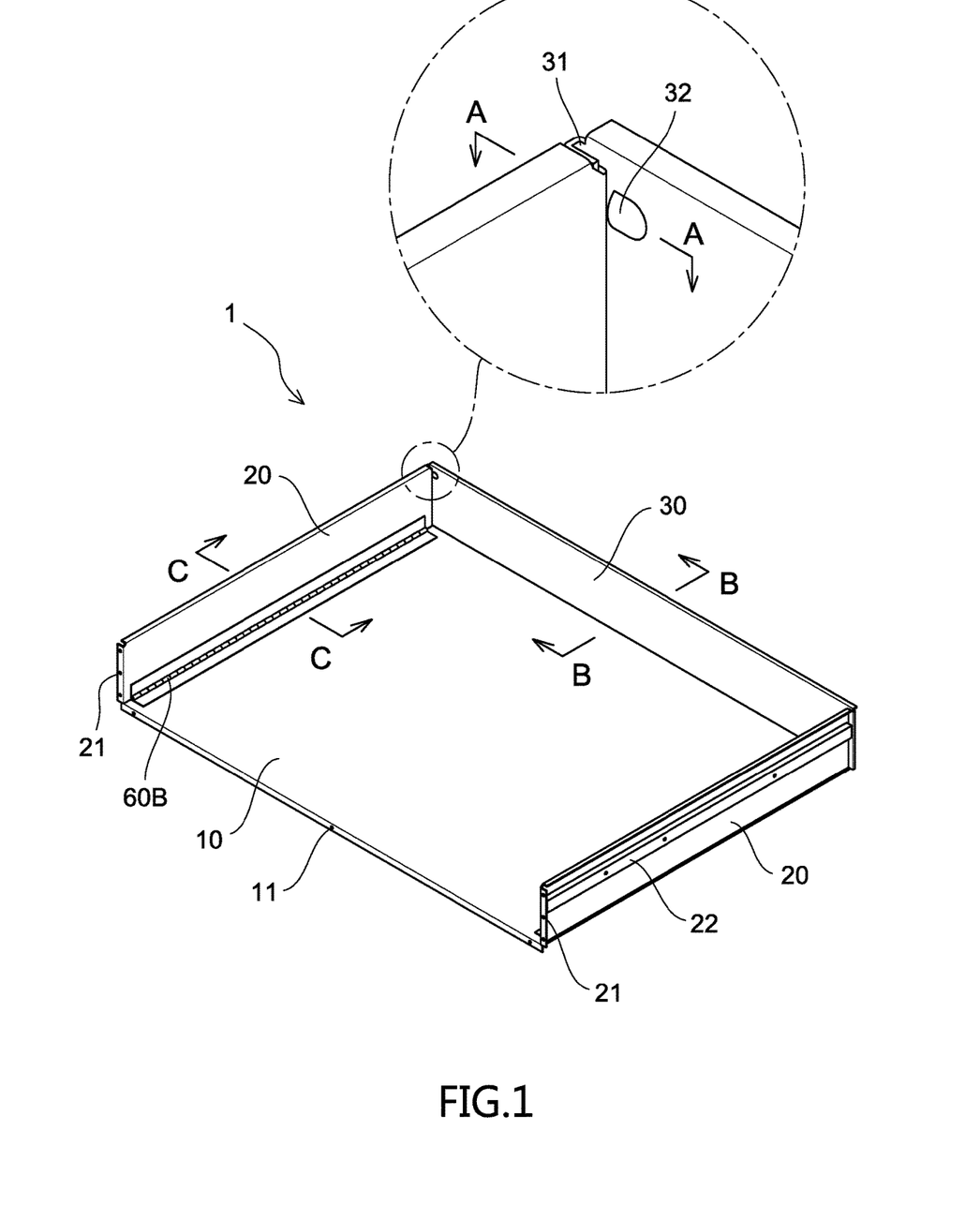
FIG. 1 is a perspective view of a folding drawer according to the invention with the front panel removed.
Figure 2:
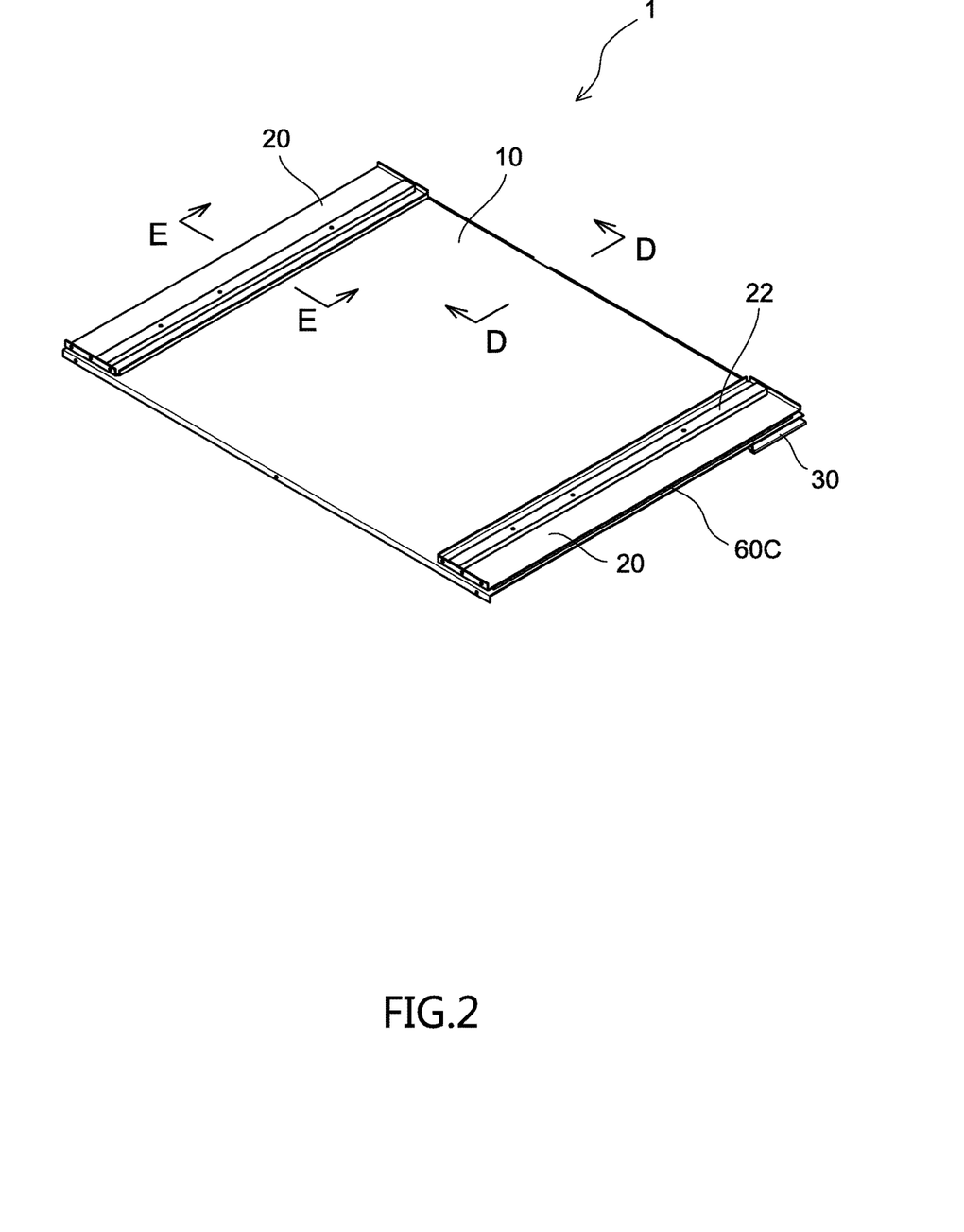
FIG. 2 is a perspective view of the drawer after being folded.
Figure 3:
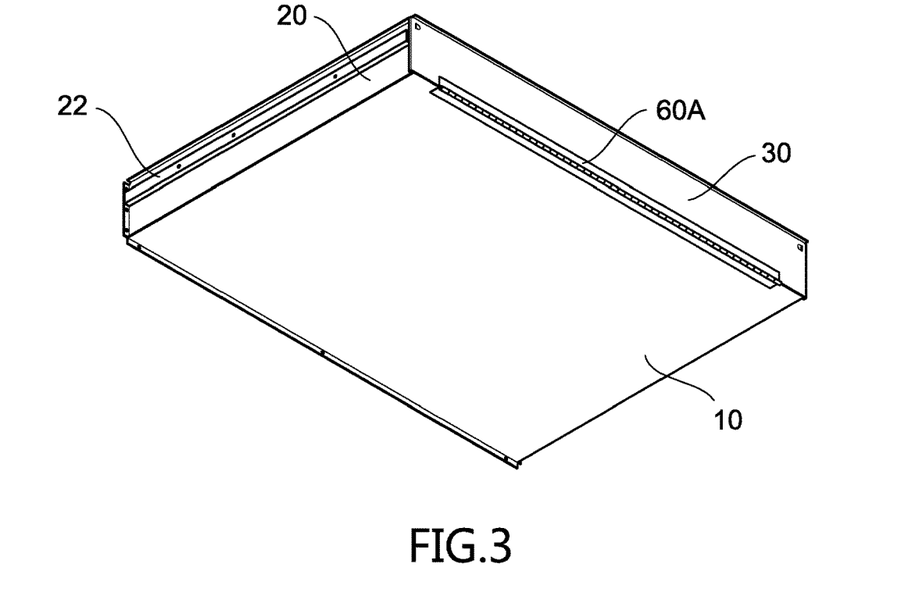
FIG. 3 is another perspective view of the folding drawer.
Figure 4:
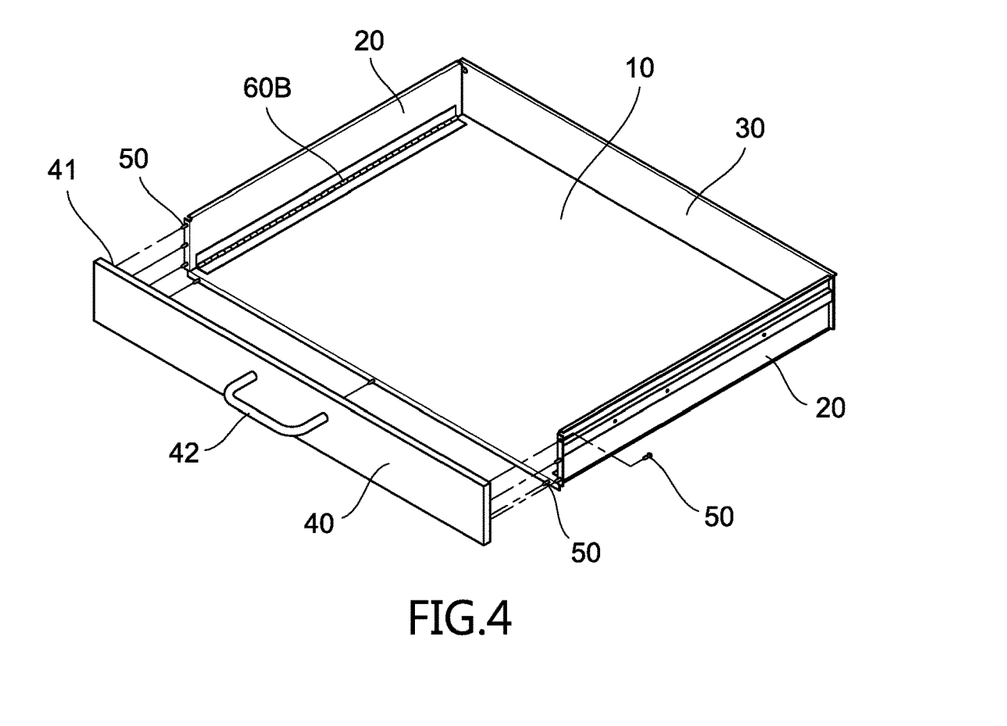
FIG. 4 is a perspective view of the folding drawer with the front panel to be assembled.
Figure 5:
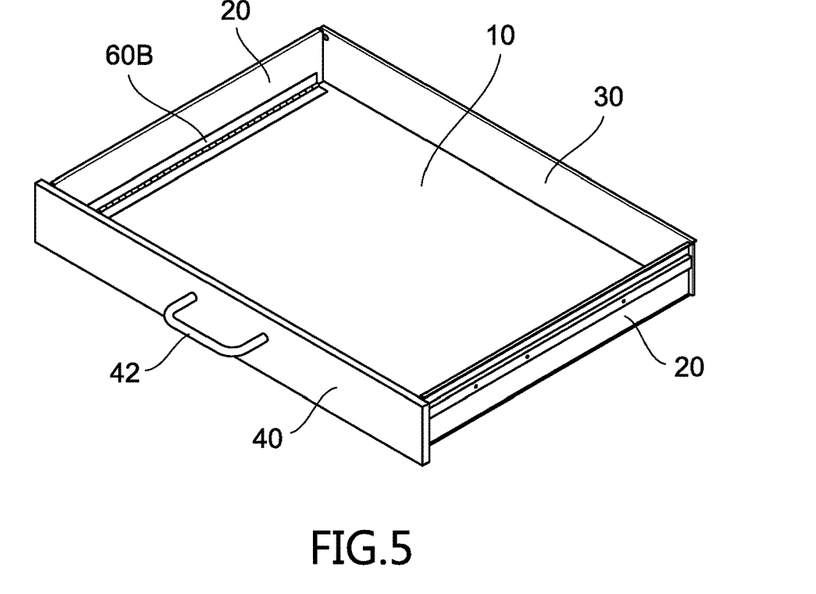
FIG. 5 is a perspective view of the folding drawer after the front panel has been assembled.
Figure 6:
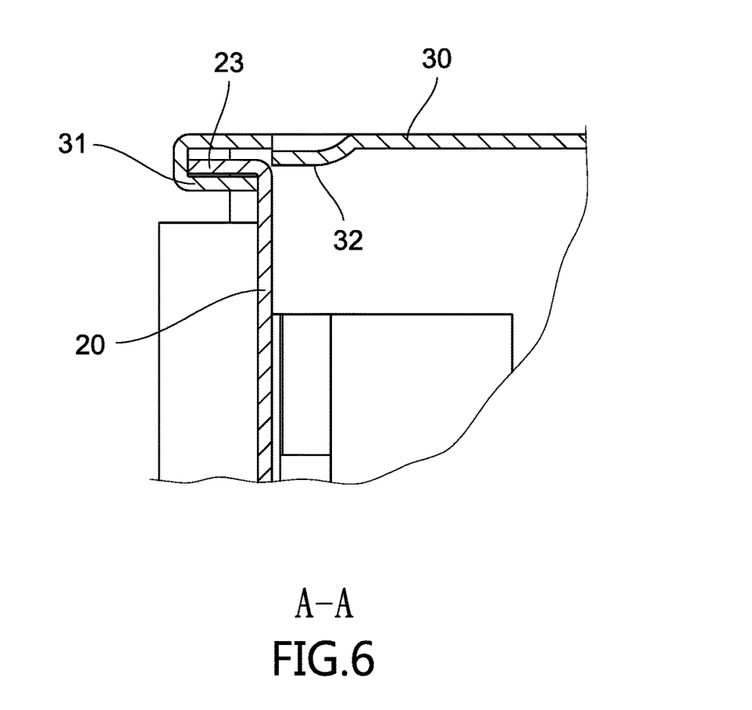
FIG. 6 is a sectional view taken along line A-A of FIG. 1.
Figure 7:
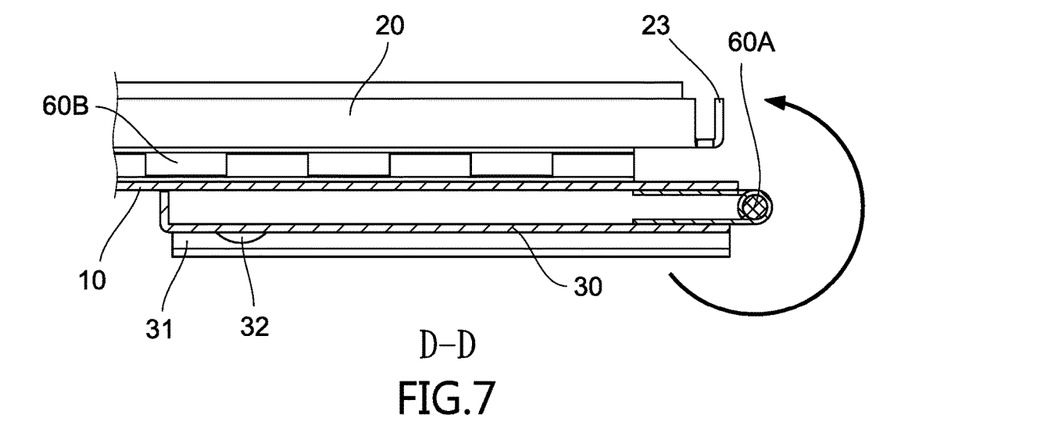
FIG. 7 is a sectional view taken along line D-D of FIG. 2.
Figure 8:
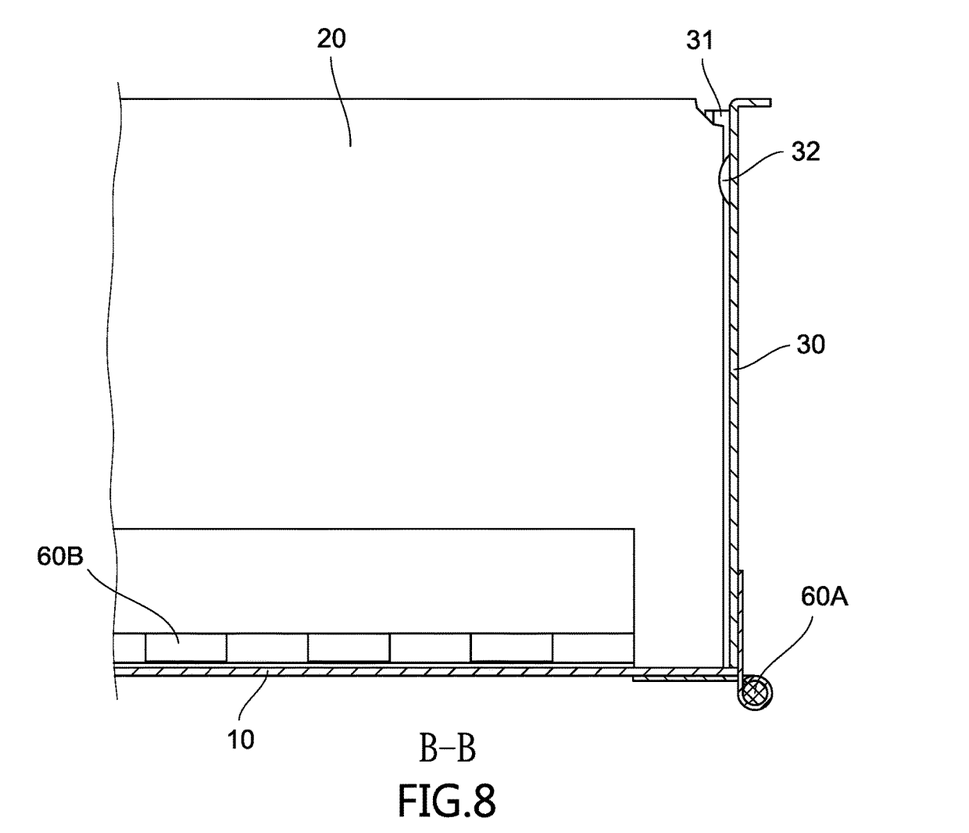
FIG. 8 is a sectional view taken along line B-B of FIG. 1.
Figure 9:
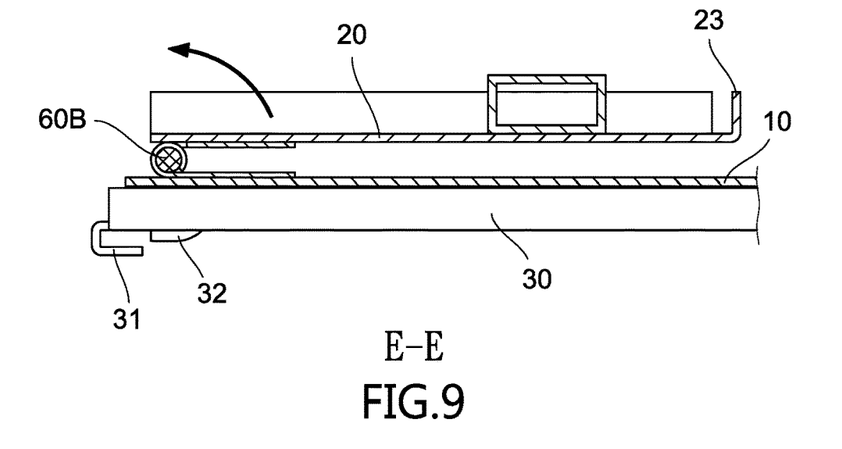
FIG. 9 is a sectional view taken along line E-E of FIG. 2.
Figure 10:
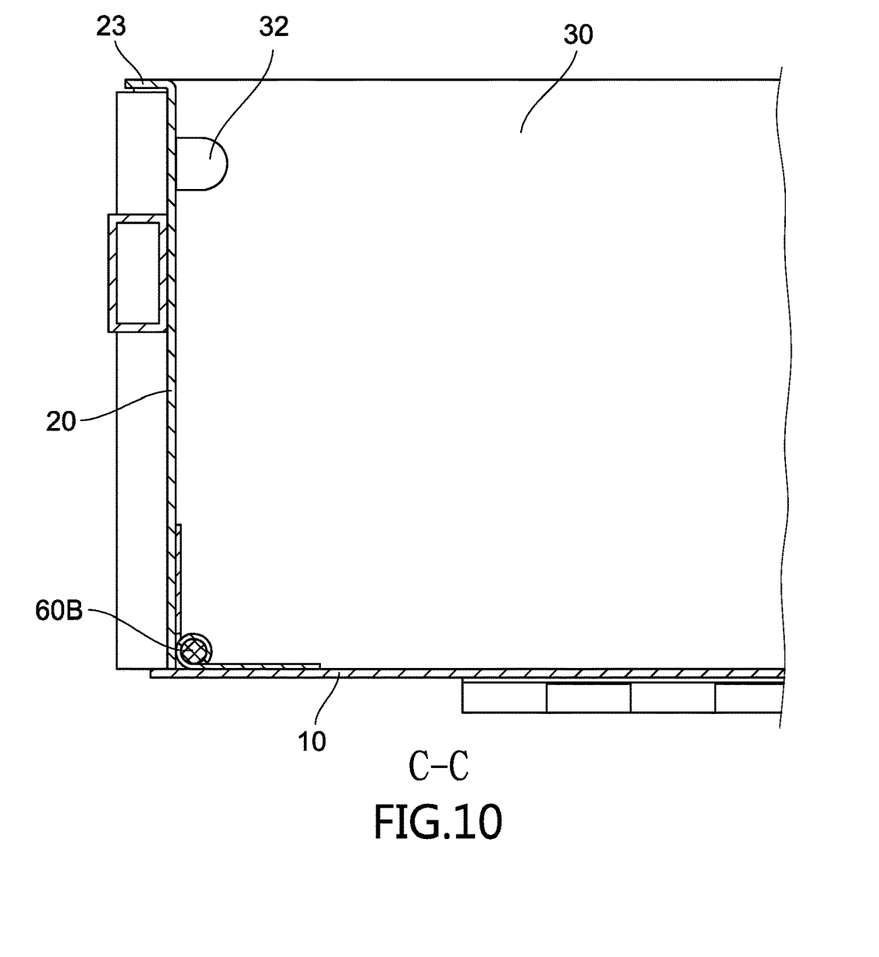
FIG. 10 is a sectional view taken along line C-C of FIG. 1.
Figure 11:
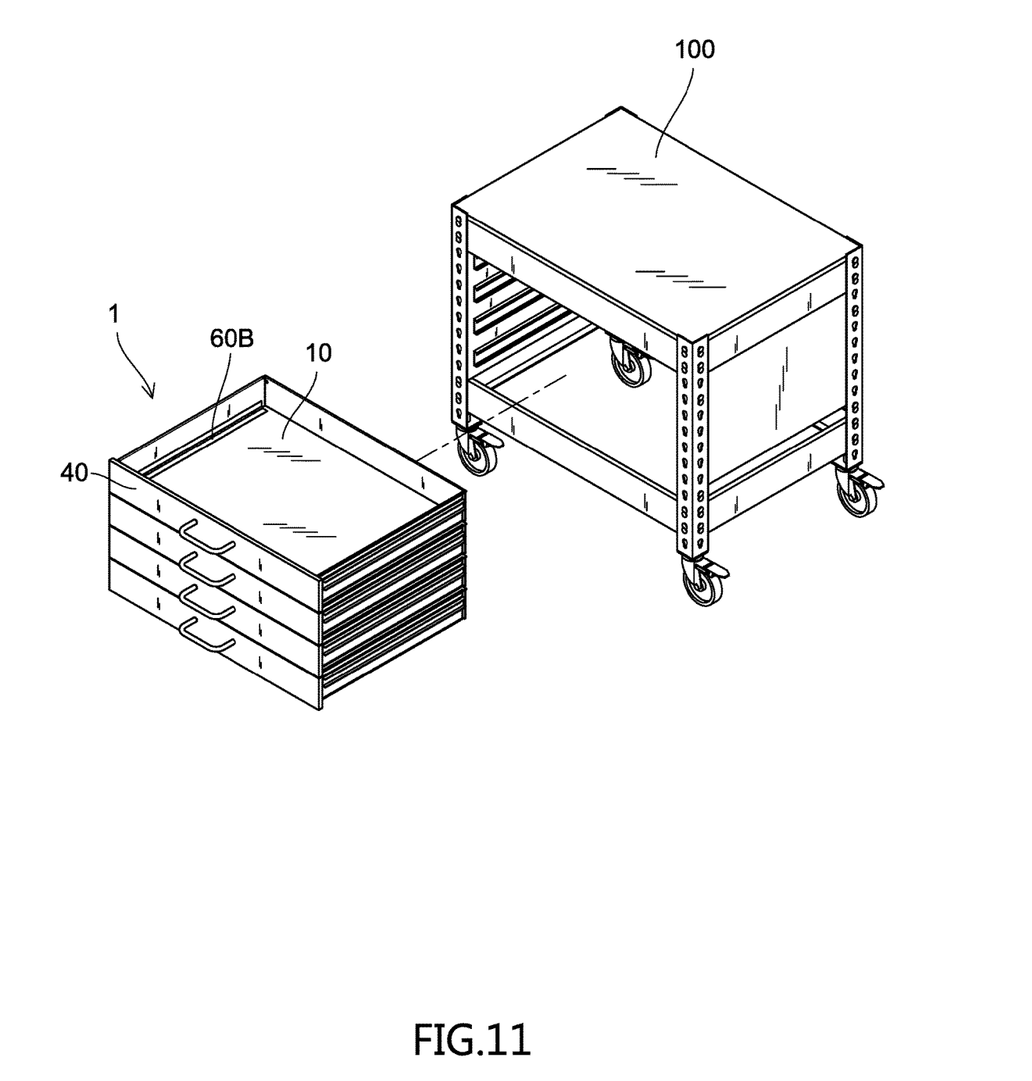
FIG. 11 is a perspective view showing the folding drawers to be assembled in a wheeled first cabinet.
Figure 12:
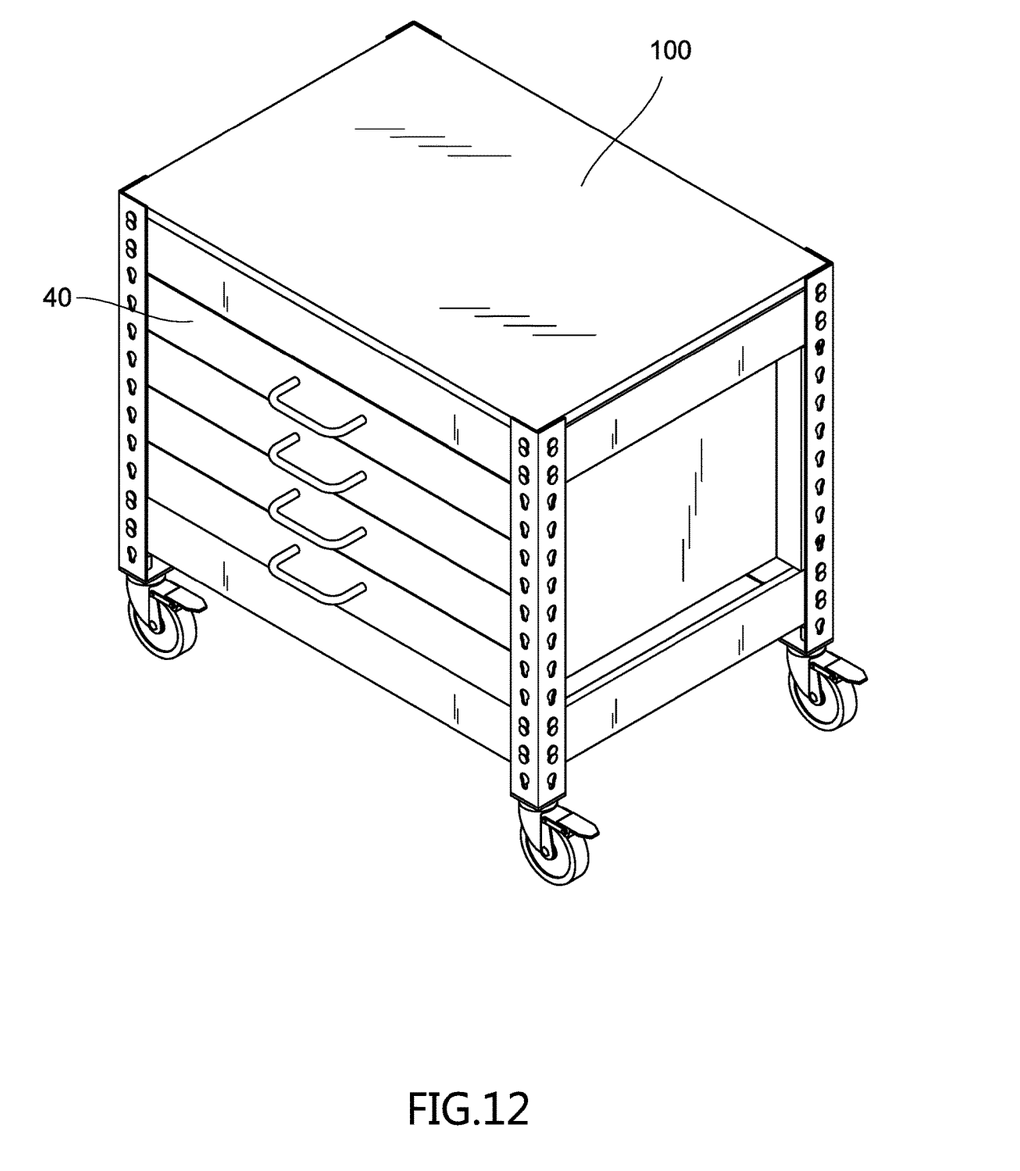
FIG. 12 is a perspective view of the assembled first cabinet.

As shown in FIGS. 11 and 12 specifically, the employee may stack the folding drawers 1 prior to slide same into a wheeled first cabinet 100 by means of the slides. As a result, the wheeled first cabinet 100 is assembled.

Figure 13:
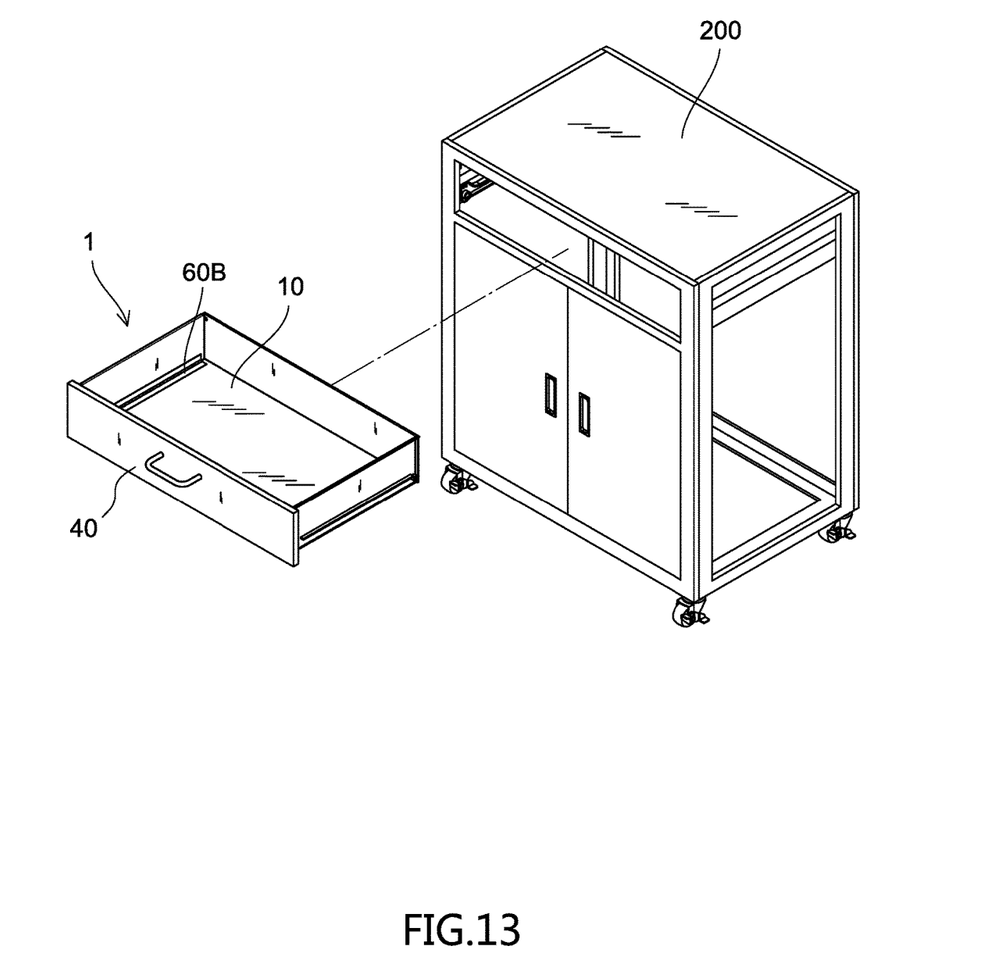
FIG. 13 is a perspective view showing the folding drawer to be assembled in a wheeled second cabinet.

As shown in FIG. 13 specifically, the employee may slide the folding drawer 1 into a wheeled second cabinet 200 by means of the slides. As a result, the wheeled second cabinet 200 is assembled.

While the invention has been described in terms of preferred embodiments, those skilled in the art will recognize that the invention can be practiced with modifications within the spirit and scope of the appended claims.

What is claimed is:

1. A folding drawer for cabinet, comprising:
a bottom board including a plurality of holes in a front end;
two side panels each including a plurality of holes in a front end, a slide on an outer surface, and an L-shaped positioning member on a top of a rear end;
a rear panel including two U-shaped grooves on two sides respectively, and two flexible projections each adjacent to the U-shaped groove wherein the L-shaped positioning member is configured to dispose in the U-shaped groove;
a front panel including a plurality of holes in a lower portion of a rear surface;
a plurality of pins each having two ends fitted in either the hole of the front panel and the hole of the bottom board respectively or the hole of the front panel and the hole of either side panel respectively; and
first, second and third hinges wherein the first hinge is disposed on a joining portion of a rear surface of the rear panel and a bottom of the bottom board, the second hinge is disposed on a joining portion of an inner surface of one side panel and a top of the bottom board, and the third hinge is disposed on a joining portion of an inner surface of the other side panel and the top of the bottom board.

2. The folding drawer for cabinet of claim 1, wherein the front panel further comprises a handle on a front surface.

3. The folding drawer for cabinet of claim 1, wherein in an assembly operation, it is possible of counterclockwise pivoting the rear panel 270-degree so that the rear panel is perpendicular to the bottom board, counterclockwise pivoting each side panel 90-degree so that each side panel is perpendicular to the bottom board, pressing both the flexible projections to insert the L-shaped positioning members into the U-shaped grooves respectively, and inserting two ends of each pin into either the hole of the front panel and the hole of the bottom board respectively or the hole of the front panel and the hole of either side panel respectively.

4. The folding drawer for cabinet of claim 1, wherein the folding drawer is configured to be disposed in a cabinet by means of the slides.

* * * * *